United States Patent [19]
Hayami

[11] 3,825,940
[45] July 23, 1974

[54] FOCAL PLANE SHUTTER
[75] Inventor: Tadao Hayami, Tokyo, Japan
[73] Assignee: Kabushiki Kaisha Koparu, Tokyo-To, Japan
[22] Filed: Oct. 3, 1972
[21] Appl. No.: 294,547

[30] Foreign Application Priority Data
Oct. 6, 1971 Japan.............................. 46-78455

[52] U.S. Cl................. 354/241, 354/251, 354/252, 354/260
[51] Int. Cl. ............................................. G03b 9/36
[58] Field of Search................................. 95/55, 60

[56] References Cited
UNITED STATES PATENTS
2,901,954   9/1959   Amano ................................... 95/55
2,927,519   3/1960   Matsuda ................................. 95/55
2,975,689   3/1961   Chatani.................................. 95/55
3,078,776   2/1963   Okabe..................................... 95/55
3,580,156   5/1971   Loseries................................. 95/60
3,628,438  12/1971   Loseries................................. 95/55

Primary Examiner—Samuel S. Matthews
Assistant Examiner—Russell E. Adams, Jr.
Attorney, Agent, or Firm—Cushman, Darby & Cushman

[57] ABSTRACT

A focal plane shutter having a shutter blade closing actuating member actuated by a release interlocking plate moved in association with the shutter release operation is disclosed. The closing actuating member is actuated through a release actuating lever, whose positional condition is controlled by a high-speed control cam capable of adjustment only by manual operation. The shutter may be adjusted at the time of its manufacture such as to exactly provide an intended exposure time.

1 Claim, 5 Drawing Figures

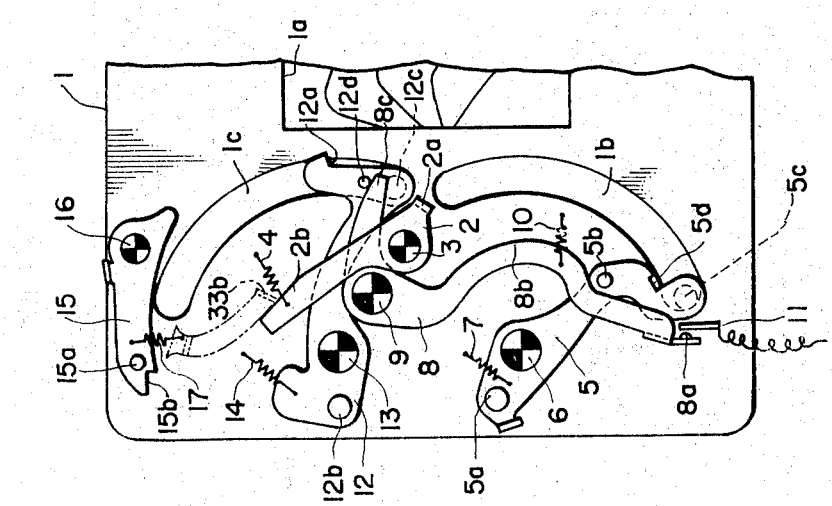

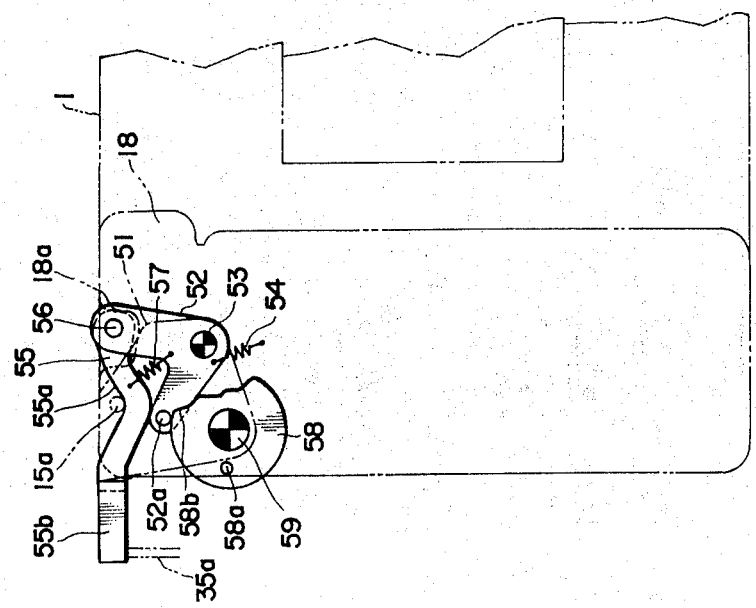

FOCAL PLANE SHUTTER

BACKGROUND OF THE INVENTION a. Field of the Invention

The present invention relates to focal plane shutters, and more particularly it pertains to exposure time presetting means enabling exact control of an exposure time intended at the time of manufacture of such shutters for a high-speed exposure range where the exposure time is adjusted by slit width adjustment.

b. Description of the Prior Art

The known focal plane shutters include ones in which opening shutter blades or front curtain and closing shutter blades or rear curtain are individually locked in the cocked positions. The opening shutter blades thus locked are released as a first movable member having a separate actuating source is actuated by the release operation of the camera, and thereafter the closing shutter blades are released by a second movable member constructed to operate together with the first movable member. In the adjustment of such shutters after assemblage thereof to exactly provide for an intended exposure time, the timing of releasing of the closing shutter blades is varied with respect to the timing of releasing of the opening blades by varying the relative positions of the first and second movable mambers. This method is used only when setting a high-speed exposure time. To provide for a low-speed exposure time, that is, the exposure where the closing shutter blades start to close the exposure aperture at a predetermined time after the opening shutter blades have gone out of the exposure aperture, the action of the second movable member is delayed.

However, with the control means consisting of the first movable member and the second movable member operating together therewith, it has been impossible to adjust at the time of manufacture of the shutter only one of a plurality of selectable high-speed exposure times. For example, with a shutter having three selectable high-speed exposure times of 1 ms, 2 ms and 4 ms, if the exposure time of 1 ms is changed to 0.5 ms by changing the relative positions of the component parts of the control means, the other exposure times are also affected. From similar reasons, it has also been impossible to adjust only one of the selectable exposure times by changing the shape or dimensions of these parts.

SUMMARY OF THE INVENTION

The primary object of the present invention is to provide a focal plane shutter, with which it is possible to adjust at the time of its manufacture only one of the selectable exposure times to an intended value without affecting the other exposure times.

To this end, according to the present invention provision is made of a release means, which is always operated at a constant speed at the time of the shutter operation for high-speed exposure irrespective of the selected exposure time. With this release means it is made possible to adjust the time interval from the instant of release of the opening shutter blades till the instant of release of the closing shutter blades by manipulating a manually adjustable cam normally held in a fixed position.

Another object of the present invention is to provide a focal plane shutter, which is simple in construction and with which it is possible to reliably and exactly adjust the exposure time over the entire high-speed and low-speed exposure ranges.

A further object of the present invention is to provide a focal plane shutter, with which there is no possibility for the preadjusted exposure time to be deviated due to oscillations or shocks at the time of the shutter operation.

BRIEF DESCRIPTION OF THE DRAWINGS

FIG. 1 is a fragmentary front elevational view showing the shutter blade actuating mechanism of an embodiment of the focal plane shutter according to the present invention;

FIG. 2 is a fragmentary elevational view showing shutter charge and release mechanisms of the same embodiment;

FIG. 3 is a fragmentary elevational view showing a release timing control mechanism for the closing shutter blades used for the control of the high-speed exposure time;

FIG. 4 is a fragmentary elevationsl view showing the whole shutter control mechanism.

DESCRIPTION OF THE PREFERRED EMBODIMENT

Figure 5:
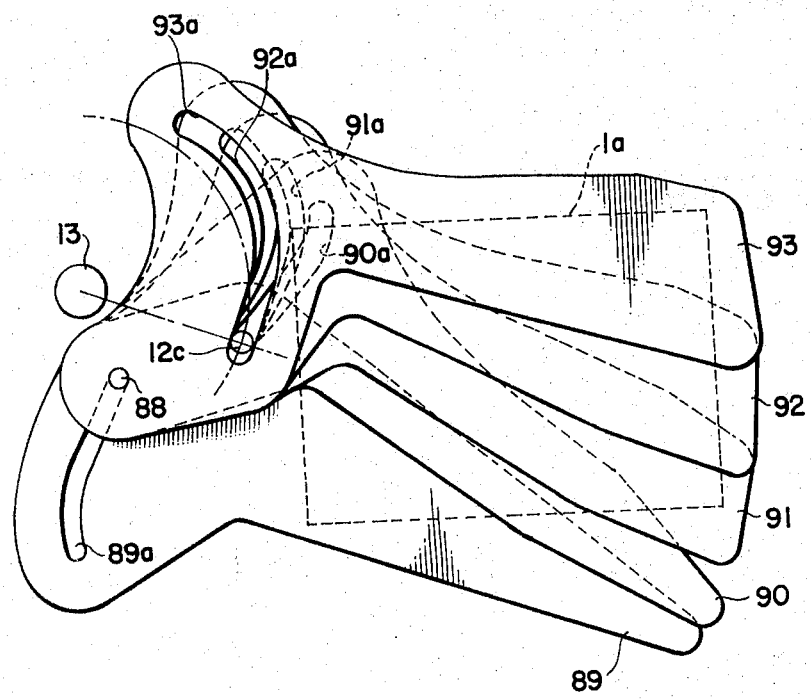
FIG. 5 is an elevational view showing only the closing shutter blades.

Referring now to FIG. 1, reference numeral 1 designates a base plate having an exposure aperture 1a and arcuate slots 1b and 1c. Numeral 2 designates an opening release lever pivoted by a pin 3 to the base plate 1 and biased by a spring 4 to the clockwise direction. The opening release lever 2 has a bent portion 2a and an arm portion 2b. Numeral 5 designates an opening actuating member pivoted by a pin 6 to the base plate 1 and biased by a spring 7 to the clockwise direction. The opening actuating member 5 has pins 5a and 5b, a pin 5c penetrating the base plate 1 through the slot 1b therein to the back thereof, and a hook portion 5d adapted to engage with the bent portion 2a. Numeral 8 designates an X-contact lever pivoted by a pin 9 to the base plate 1 and biased by a spring 10 to the counter-clockwise direction. The X-contact lever 8 has a contact 8a, a cam portion 8b co-operating the pin 5b and an arm portion 8c co-operating a pin 12d to be described later. The contact 8a can be brought into electric contact with a fixed contact 11. Numeral 12 designates a closing actuating member pivoted by a pin 13 to the base plate 1 and biased by a spring 14 to the clockwise direction. The closing actuating member 12 has a hook portion 12a, a pin 12b, a pin 12c penetrating the base plate 1 through the slot 1c the rein to the back thereof and the above-mentioned pin 12d. Numeral 15 is a closing release lever pivoted by a pin 16 to the base plate 1 and biased by a spring 17 to the counter-clockwise direction. The closing release lever 15 has a pin 15a and a hook portion 15b adapted to engage with the hook portion 12a.

Referring to FIG. 2, reference numeral 18 designates a plate secured to the base plate 1 and held at a suitable distance therefrom. The plate 18 is formed with a recess 18a and slots 18b, 18c and 18d. The parts shown in FIG. 2 are all provided on the back side of the plate 18. Numeral 19 designates a main release lever pivoted by a pin 20 to the plate 18 and biased by a spring 21 to the clockwise direction. The main release lever 19 has an arm 19a. Numeral 22 designates a hook lever pivoted to the main release lever 19 by a pin 23 penetrating the plate 18 through the slot 18d therein to the front side thereof. The hook lever 22 is biased by a spring 24 to the clockwise direction, and it has a hook portion 22a and a bent portion 22b engaged with the lever 19. Numeral 25 designates M-contact release lever pivoted by a pin 26 to the plate 18 and biased by a spring 27 to the clockwise direction. The M-contact release lever 25 has a hook portion 25a and a bent portion 25b engaged with the arm 19a. Numeral 28 designates a M-contact actuating lever pivoted by a pin 29 to the plate 18 and biased by spring 30 in the counter-clockwise direction. The M-contact actuating lever 28 has an arm 28a, a pin 28b penetrating the plate 18 through the slot 18b therein to the front side thereof and a bent portion 28c adapted to engage with the hook portion 25a. Numeral 31 designates a release actuating lever pivoted by a pin 32 to the plate 18 and has a stepped portion 31a adapted to engage with the hook portion 22a. Numeral 33 designates a release lock lever pivoted by a pin 34 to the plate 18 and having a bent portion 33b adapted to engage with the arm 2b of the opening release lever 2 as shown in FIG. 1. Numeral 35 designates a release interlocking plate pivotally linked to the levers 31 and 33 for pantagraph movement and biased by a spring 36 in the upper direction. The release interlocking plate 35 has a bent portion 35a formed with notches 35b and 35c. Numeral 37 designates a gear mounted on a shaft 38 and having pins 37a and 37b and a gear portion 37c meshing with a winding mechanism not shown of the camera. The gear 37 can be rotated for one half rotation to the clockwise direction by operating the winding mechanism. Numeral 39 designates a charge lever pivoted by a pin 32 to the plate 18 and having a pin 39a adapted to engage with the lever 31 and an arm 39b adapted to engage with the pins 37a and 37b. Numeral 40 designates an additional charge lever pivoted by a pin 34 to the plate 18. Numeral 41 designates a charge link member pivotally linked to the levers 39 and 40 for pantagraph movement and having bent portions 41a and 41b adapted to engage with and push the pins 12a and 5a of the respective closing and opening actuating member 12 and 5. Numeral 42 designates a synchro-lever pivoted by a pin 43 to the plate 18 and biased by a spring 43 to the counter-clockwise direction. The synchro-lever 42 has an arm 42a and a pin 42b penetrating the plate 18 through the slot 18c therein to the front side thereof. Numeral 45 designates an M-synchro-sector gear pivoted by a pin 46 to the plate 18 and biased by a spring 47 to the clockwise direction. It has a projection 45a and a pin 45b, and the extent of its clockwise movement is controlled by the arm 42a engaging with the projection 45a. Gears 48 and 49 and an anchor 50 co-operate with the M-synchro-sector gear 45 and constitute therewith an M-synchro-governer.

Referring to FIG. 3, reference numeral 51 designates a plate secured to the plate 18 on the front side thereof in the drawing and at a suitable distance therefrom. Numeral 52 designates a closing control lever pivoted by a pin 53 to the plate 51 on the back side thereof and biased by a spring 54 to the counter-clockwise direction. Numeral 55 designates a closing release actuating lever pivoted to the lever 52 by a pin 56 extending across the recess 18a of the plate 18 such that is located on the back side of the plate 18. The closing release actuating lever 55 has a cam portion 55a engaging with the pin 15a of the closing release lever 15 shown in FIG. 1 and an arm portion 55b adapted to engage with the top of the bent portion 35a of the release interlocking plate 35 shown in FIG. 2. Numeral 58 designates a high-speed control cam pivoted by a pin 59 to the plate 51 on the back side thereof and having a pin 58a and a cam portion 58b receiving the pin 52 a.

Referring to FIG. 4, reference numeral 60 designates a low-speed control lever rotatally mounted on a pin 34. The low-speed control lever 60 is integral with the release lock lever 33 shown in FIG. 2 and biased by a spring 36 to the clockwise direction, and it has an arm 60a. Numeral 61 designates an interlocking lever co-operating with a sector gear of the well-known gear governer interposed between upper and lower plates 62 and 63. The interlocking lever 61 is pivoted by a pin 64 to the upper plate 62 and biased by a spring 65 to the clockwise direction, and it has a pin 61a and an arm 61b adapted to engage with the arm 60a. Numeral 66 designates a low-speed control cam rotatably mounted on a fixed pin 59 to control the extent of the clockwise movement of the interlocking lever 61 by receiving the pin 61a. The low-speed control cam 66 is integral with the high-speed control cam 58 shown in FIG. 3. Numeral 67 designates a B-lever pivoted by a pin 69 to a plate 68 secured to the plate 18 and held at a suitable distance therefrom. The B-lever 67 is biased by a spring 70 to the counter-clockwise direction, and it has a cam 67a, a projection 67b adapted to engage with the pin 58a, a projection 67c projecting into the notch 35c, and an arm 67d adapted to engage with the pin 59 to thereby restrict its counter-clockwise rotation. Numeral 71 designates a movable M-contact lever pivoted by a pin 72 to the plate 68 and biased by a spring 73 to the clockwise direction. The movable M-contact lever 71 has an arm 71a adapted to engage with the pin 28b of the M-contact operating lever 28 to thereby restrict its clockwise rotation and an arm 71b adapted to engage with the bent portion 35a of the release interlocking plate 35 shown in FIG. 2 and penetrate the notch 35b. The movable M-contact lever 71 is constructed integrally with an M-movable contact 74 having a bent portion 74a. Numeral 75 designates an M-stationary contact secured to the plate 68 and electrically insulated therefrom through an insulating sheet 76. The M-stationary contact 75 has a bent portion 75a adapted to engage with the bent portion 74a. Numeral 77 designates a timer release lever constituting part of a well-known gear governer interposed between upper and lower plates 78 and 79. The timer release lever 77 is pivoted by a pin 80 to the upper plate 78 and biased by a spring 81 to the clockwise direction, and it has an arm 77a and a notch 77b adapted to engage with the notch 35b formed in the bent portion 35a of the aforementioned release interlocking plate 35. Numeral 82 designates a timer charge lever pivoted by a pin 83 to the upper plate 78 and biased by a spring 84 constituting the drive source of the self timer to the clockwise direction. The timer charge lever 82 has a cam 82a engaging with the arm 77a of the lever 77 and a pin 82b for manual operation. Numeral 85 designates a timer lock lever pivoted by a pin 86 to the plate 78 and biased by a spring 87 to the counter-clockwise direction. The timer lock lever 85 has a bent portion 85a capable of engaging with the final stage part of the aforementioned gear governer to lock the motion thereof and also adapted to engage with a pin 23 extending from the main release lever 19 explained referring to FIG. 2.

Referring to FIG. 5, numeral 88 designates a pin extending from the back side of the base plate 1. Numerals 81 to 93 designate closing shutter blades having respective cam grooves 89a to 93a. The blade 89 is pivotably mounted on the pin 12c of the closing actuating member 12 on the back side of the base plate 1, and its cam groove 89a slidably receives the pin 88. The other blades 90 to 93 are pivotably mounted on the pin 88 on the back side of the base plate 1, and their cam grooves 90a to 93a slidably receive the pin 12c. While only the closing shutter blades are shown in FIG. 5, actually another set of blades, i.e., opening shutter blades are provided similar to the closing shutter blade set but in a vertically opposite way.

The operation of the embodiment described above according to the present invention will now be described. The parts shown in FIGS. 1 to 5 are all in their stationary states. The cocking of the shutter from this state will first be described.

The cocking operation of the shutter is effected by turning the gear 37 shown in FIG. 2 or 4 180° to the clockwise direction. Referring to FIG. 2, with the clockwise rotation of the gear 37 the pin 37a thereof strikes and pushes the arm 39b of the charge lever 39 to cause counter-clockwise rotation thereof, and then it detaches from the arm 39b and reaches the position of the pin 37b to end the shutter cocking operation. As the charge lever 39 is rotated counter-clockwise, its pin 39b pushes the release actuating lever 31 to cause counter-clockwise rotation thereof. As a result, the lever 31 lowers the release interlocking plate 35 to cause counter-clockwise rotation of the release lock lever 33. At the end of the counter-clockwise rotation of the lever 31, the stepped portion 31a thereof engages with the hook portion 22a of the hook lever 22, whereby the lever 31 is locked against its clockwise rotation by the force of the spring 36. Meanwhile, as the release lock lever 33 is rotated counter-clockwise, its bent portion 33b swings to the right, causing the clockwise rotation of the arm 2b of the opening release lever 2 shown in FIG. 1. Further, as the release interlocking plate 35 is lowered, the movement of its bent portion 35a is followed by the arm 55b of the closing release actuating lever 55 biased to the counter-clockwise direction in FIG. 3, thus causing the clockwise roatation of the lever 55, whose movement is in turn followed by the pin 15a of the closing release lever 15 shown in FIG. 1 to cause counter-clockwise rotation thereof. By such rotation of the levers 2 and 15 the charge lock preparation for the opening and closing actuating members 5 and 12 to be described next is ended.

As the charge lever 39 shown in FIG. 2 is rotated counter-clockwise, it lowers the charge link member 41, whereby the bent portions 41a and 41b thereof push respective pins 12b and 5b, causing counter-clockwise rotation of the opening and closing actuating members 5 and 12 shown in FIG. 1 so as to bring the hook portions 5d and 12a of the respective members 5 and 12 into engagement respectively with the bent portion 2a of the release lever 2 and the hook portion 15b of the release lever 15. As the member 5 is rotated counter-clockwise, its pin 5b pushes the cam 8b to prevent the counter-clockwise rotation of the X-contact lever 8 due to the escapement of the pin 12d accompanying the following counter-clockwise rotation of the closing actuating member 12, thereby preventing the contact 8a from being brought into contact with the stationary contact 11. During its downward movement, the charge link member 41 shown in FIG. 2 first pushes the pin 5a and then pushes the pin 12b, whereby the opening shutter blades can overlap the closing shutter blades sufficiently deeply in the course of the cocking, thus preventing leakage of light during the movement of the blades. With the rotation of the pin 12c about the pin 13, the closing shutter blades 89 to 93 shown in FIG. 5 are caused to overlap one another above the upper edge of the exposure aperture 1a. At this time, the exposure aperture 1a is already closed by previously actuated opening shutter blades not shown. As the release lock lever 33 shown in FIG. 2 is rotated counter-clockwise, the low-speed control lever 60 is also rotated counter-clockwise to cause clockwise rotation of the interlocking lever 61 by the force of the spring 65 until the pin 61a engages the cam 66a. While the cocking operation of the shutter is completed in the above manner, as the pin 37a of the gear 37 rotated to the clockwise direction is subsequently detached from the arm 39b as mentioned earlier, the charge link lever 39, additional charge lever 40, and charge link member 41 all return to their initial positions shown in FIG. 2.

The shutter release operation will now be described. It is effected by rotating the main release lever 19 shown in FIG. 2 to the counter-clockwise direction. As the lever 19 is rotated counter-clockwise, it causes the hook lever 22 to release the lock of the release actuating lever 31, thus causing the rising of the release interlocking plate 35 and also clockwise rotation of the release lock lever 33. As the lever 33 is rotated clockwise, its bent portion 33b pushes the arm 2b of the opening release lever 2 to cause counter-clockwise rotation thereof, thus releasing the lock of the opening actuating member 5 to cause clockwise rotation thereof. In this way, the opening shutter blades not shown having the same shape as the closing shutter blades 89 to 39 but vertically opposite thereto are opened by the pin 5c to open the exposure aperture 1a. As the release lock lever 33 shown in FIG. 2 is rotated clockwise, its projection 33a is brought into engagement with the projection 45a of the M-synchro-sector gear 45, so that the gear governer in co-operation with the gear 45 provides a delay time from the instant of release of the lever 31 till the instant of release of the lever 33. Also, as the lever 5 is rotated clockwise, its pin 5b is detaches from the cam 8b to release the X-contact lever 8 for the rotation thereof by the force of the spring 10, so that the contact 8a of the lever 8 is brought into contact with the stationary contact 11.

Further, with the counter-clockwise rotation of the main release lever 19 the M-contact release lever 25 is also rotated counter-clockwise to release the lock of the M-contact actuating lever 28, whereupon the pin 28b of the lever 28 is followed by the arm 71a of the movable M-contact lever 71 to cause clockwise rotation thereof, thus bringing the M-movable contact 74 into contact with the M-stationary contact 75. The M and X contacts are always actuated at the time of the exposure, and they may be switched appropriately according to the flash lamp used. The timing of the engagement of the lever 33 shown in FIG. 2 with the gear 45 is determined by the position of the projection 45a of the gear 45, which position is in turn determined as the position of the pin 42b of the synchro-lever 42 is controlled by a cam not shown and integral with the low-speed control cam 66 shown in FIG. 4. Thus, the timing is set according to the exposure time.

The exposure is ended in the following way.

In case of the low-speed exposure, that is, in case when the closing shutter blades begin to cover the exposure aperture 1a after the aperture has been completely opened by the opening shutter blades, the exposure time is controlled by reducing the speed of the rising of the release interlocking plate 35. In more detail, after the opening release lever 2 shown in FIG. 2 is actuated by the clockwise rotation of the release lock lever 33, the arm 60a of the low-speed control lever 60 shown in FIG. 4 and integral with the lever 33 is brought into engagement with the arm 61b of the interlocking lever 61, whose position is controlled by the previously set low-speed control cam 66. In this way, the speed of the clockwise rotation of the lever 60 is regulated by the gear governer coupled to the interlocking plate 61. By delaying the action of the lever 33 in the above manner, the rising of the interlocking plate 35 pivotally coupled to it is delayed to delay the timing of pushing the arm 55b of the closing release lever 55 shown in FIG. 3 with the top end of the bent portion 35a of the interlocking plate 35. With the clockwise rotation of the lever 55 caused in the above way the cam 55a thereof pushes the pin 15a of the closing release lever 15, causing clockwise rotation thereof to release the lock of the closing actuating member 12, whereby the closing shutter blades 89 to 93 held above the upper edge of the exposure aperture 1a in the overlapping form as mentioned earlier is rotated clockwise by the pin 12c back to their initial positions as shown in FIG. 5, thus ending the exposure.

In case of the high-speed exposure, that is, in case when the exposure aperture 1a is always partly shut by the shutter blades from the start till the end of the exposure, even in such case as the closing shutter blades 89 to 93 shown in FIG. 5 appear within the exposure aperture 1a immediately when the opening shutter blades gets out of the exposure aperture, the speed of action of the interlocking plate 35 shown in FIG. 2 is restricted in no way but is always constant. Here the exposure time is controlled by controlling the timing of the actuation of the closing release lever 15 shown in FIG. 1, that is, the position of the lever 33 under the stroke, at which the lever 15 is actuated. In more detail, the arm 61b of the interlocking lever 61 is shifted out of the operation range of the arm 61a of the low-speed control lever 60 by operating the low-speed control cam 66. Also, the position of the pin 52a is shifted by operating the high-speed control cam 58 constructed to operate integrally with the cam 66 and shown in FIG. 3, thereby controlling the position of the control lever 52. By so doing, the position of the cam 55a of the closing release actuating lever 55 shown in FIG. 3 relative to the pin 15a of the closing release lever 15 shown in FIG. 1 (and also shown in FIG. 3) may be changed. Considering that the lever 52 is at a position obtained by rotating it counter-clockwise from its position shown in FIG. 3, the position of the pin 15a at the instant when the closing release lever 15 shown in FIG. 1 gets out of engagement with the hook portion 12a of the closing actuating member 12 is always constant, while the position of the cam 55a is changed from its position shown in FIG. 3. Thus, the position of the arm 55b is also changed, and the position of the lever 55, at which the arm 55b is brought into engagement with the bent portion 35a, is lowered compared to the illustrated position. In other words, the bent portion 35a engages with the arm 55b and brings the pin 15a to the release position at an advanced instant.

Now, the so-called B-exposure and the exposure using the self-timer will be described.

For the B-exposure, the pin 58a of the high-speed control cam 58 shown in FIG. 3 is set to face the projection 67b of the B-lever 67 shown in FIG. 4, and the B-lever 67 is slightly turned counter-clockwise so as to bring it into engagement with a rod-like member to be described later. Then, a release member not shown on the camera body side is operated to cause the rod-like member not shown to descend from above in the drawing and push the cam 67a of the lever 67 so as to cause counter-clockwise rotation thereof. Thereafter, as the rod-like member releases a mirror mechanism of the camera not shown and pushes the arm 19a of the main release lever 19, the interlocking plate 35 already brought to its lower position by the shutter cocking operation is raised, whereby the top of its bent portion 35a is locked by the projection 67c of the lever 67. At this instant, at which the interlocking plate 35 has already released the lock of the closing actuating member 5 shown in FIG. 1 through the release lock lever 33 shown in FIG. 2, the exposure aperture 1a is opened. The exposure aperture 1a thus opened is held in this state so long as the rod-like member is held in its lower position since the interlocking plate 35 does not reach to the arm 55b of the release closing actuating lever 55 shown in FIG. 3. Thus, by subsequently raising the rod-like member back to its upper position the lever 67 is rotated clockwise by the spring 70, so that its projection 67c is retreated to raise the interlocking plate 35, thus closing the shutter.

Upon using the self-timer, the timer charge lever 82 shown in FIG. 4 is rotated counter-clockwise to charge the spring 84. The lever 82 thus brought to its leftward position is returned to its initial position only when the gear governer is actuated since, the lever 82 is coupled through a well-known reverse rotation checking mechanism such as a ratchet mechanism. With the counter-clockwise rotation of the lever 82 its cam 82a is also turned counter-clockwise to cause clockwise rotation of the timer release lever 77. In this state, the shutter cocking is done, whereby the interlocking plate 35 is lowered to bring the bent portion 35a thereof, that is, the stepped portion formed by the notch 35b in the bent portion 35a, into engagement with the notch 77b of the lever 77. Then, by the release operation as mentioned earlier the mirror mechanism is actuated to cause counter-clockwise rotation of the main release lever 19 shown in FIG. 2 so as to release the lock of the release actuating lever 31. By so doing, the interlocking plate 35 is locked by the lever 77 shown in FIG. 4. With the counter-clockwise rotation of the lever 19 the pin 23 pushes the bent portion 85a of the timer lock lever 85 shown in FIG. 4 to cause clockwise rotation thereof, whereby the bent portion 85a is detached from its position of engagement with the final stage member of the self-timer gear governer. As a result, the operation of the self-timer is started to cause the clockwise rotation of the lever 82. During the clockwise rotation of the lever 82 and furing the period during which the interlocking plate 35 is locked against rising by the lever 77, the M-contact actuating lever already released from its locked state rotates counter-clockwise, so that the pin 28b is moved from its position, at which it locks the arm 71a of the movable M-contact lever 71. However, since the arm 71b of the lever 71 is locked by the bent portion 35a against its clockwise rotation, the bent portion 74a will not come into contact with the contact 75a. Thus, during the operation of the self-timer both M and X contacts stay "off." As the lever 82 is rotated clockwise, it finally pushes the arm 77a of the lever 77 with its cam 82a to cause counter-clockwise rotation of the lever 77 so as to release the lock of the interlocking plate 35, thus effecting the shutter release. To end the exposure, the action of the arm 28a of the M-contact actuating lever shown in FIG. 2 is used as a signal to restore the mirror mechanism as mentioned earlier, thereby causing the clockwise rotation of the main release lever 19 back to its illustrated initial position.

While the preceding embodiment has been designed to suit to a single-lens reflex camera and co-operate with the mirror mechanism thereof, it may of course be readily modified for incorporation into other usual cameras. More particularly, denoting the member for locking the main release lever 19 when the latter is rotated counter-clockwise as part A, the part A may be pivoted and biased such that it is rotated clockwise to the left side of the pin 20 so that the lever 19 is locked by the part A only when the M-contact actuating lever 28 is released and brought to its leftward position, and that it is released when the lever is again rotated clockwise, that is, when the exposure is ended.

Also, while in the preceding embodiment the spring 36 shown in FIG. 2 serves to upwardly bias the release interlocking plate 35, the spring 36 may of course be substituted by a spring capable of using to bias the release actuating lever 31 or release lock lever 33 to the clockwise direction. Similarly, the spring which is not indicated by reference numeral but serving to upwardly bias the charge link member 41 shown in FIG. 2, may also be substituted by a spring capable of using to bias the charge lever 39 and additional charge lever 40.

Further, the notch 31a for holding the spring 36 in the tensioned state, projection 33a co-operating with the M-synchro-sector gear 45, bent portion 33b co-operating with the opening release lever 2 or bent portion 35a and notch 35b formed therein co-operating with the action of the self-timer and M-contacts in the use of the self-timer and also operating at the time of the B-exposure may, depending upon the arrangement of other associated parts, be provided to any one of the levers 31, 33 and 35 which are release actuating members interlocked to one another by modifying them.

I claim:

1. A focal plane shutter comprising a base plate having an exposure aperture, opening and closing actuating members individually pivoted to said base plate, separate springs biasing said opening and closing actuating members, respectively, an opening release lever pivoted to said base plate and arranged so as to lock said opening actuating member when said opening actuating member is brought to a cocked position, a closing release lever pivoted to said base plate and arranged so as to lock said closing actuating member when said closing actuating member is brought to a cocked position, a release interlocking plate arranged so as to be shifted to a cocked position in cooperation with the cocking operation of said opening and closing actuating members, a spring biasing said release interlocking plate, a closing release actuating lever operatively related to said release interlocking plate and having a cam portion thereon for engaging said closing release lever, a closing control lever pivoted to said base plate and pivotably supporting said closing release actuating lever on one arm thereof, said closing control lever being capable of moving the pivot of said closing release actuating lever to control the time of engagement of said cam portion of said closing release actuating lever and said closing release lever, and a manually operable high-speed control cam rotatably supported on said base plate and engaged with another arm of said closing control lever, wherein at the time of shifting said release interlocking plate by the shutter release operation said release interlocking plate first actuates said opening release lever and then causes said release actuating lever to actuate said closing release lever.

* * * * *